US012248652B1

(12) United States Patent
Washburn

(10) Patent No.: US 12,248,652 B1
(45) Date of Patent: Mar. 11, 2025

(54) SYSTEMS AND METHODS FOR CONSTRUCTING AUDIO/VIDEO CONTENT

(71) Applicant: Accretive Technology Group, Inc., Seattle, WA (US)

(72) Inventor: Jordan Washburn, Louisville, CO (US)

(73) Assignee: Accretive Technology Group, Inc., Seattle, WA (US)

( * ) Notice: Subject to any disclaimer, the term of this patent is extended or adjusted under 35 U.S.C. 154(b) by 85 days.

(21) Appl. No.: 18/214,166

(22) Filed: Jun. 26, 2023

Related U.S. Application Data

(60) Provisional application No. 63/358,333, filed on Jul. 5, 2022.

(51) Int. Cl.
| | |
|---|---|
| *G06F 3/0481* | (2022.01) |
| *G06F 3/0484* | (2022.01) |
| *G06F 40/143* | (2020.01) |
| *G11B 27/031* | (2006.01) |
| *G06F 3/0488* | (2022.01) |

(52) U.S. Cl.
CPC .......... *G06F 3/0481* (2013.01); *G06F 3/0484* (2013.01); *G06F 40/143* (2020.01); *G11B 27/031* (2013.01); *G06F 3/0488* (2013.01)

(58) Field of Classification Search
CPC .... G06F 3/0481; G06F 3/0484; G06F 40/143; G06F 3/0488; G11B 27/031
See application file for complete search history.

(56) References Cited

U.S. PATENT DOCUMENTS

| | | | |
|---|---|---|---|
| 2015/0026573 A1* | 1/2015 | Meng | G06F 8/61 715/716 |
| 2023/0280876 A1* | 9/2023 | Brodersen | G06F 3/04842 715/848 |

* cited by examiner

*Primary Examiner* — Phuong H Nguyen
(74) *Attorney, Agent, or Firm* — FisherBroyles LLP; Alan D. Minsk

(57) ABSTRACT

A system, apparatus, and method directed to a process for creating audio, video, or audio-video content in a browser application executing on a client device. In some embodiments, a web-based editing canvas enables a user to create a custom image, set of images, or video by adding audio, video, image, and other forms of "nodes" to a "canvas", and allowing the user to modify the nodes and then compile them into an image or video.

20 Claims, 2 Drawing Sheets

SYSTEMS AND METHODS FOR CONSTRUCTING AUDIO/VIDEO CONTENT

CROSS REFERENCE TO RELATED APPLICATION

This application claims the benefit of U.S. Provisional Application No. 63/358,333, filed Jul. 5, 2022, entitled "Systems and Methods for Constructing Audio/Video Content", the disclosure of which is incorporated, in its entirety by this reference.

BACKGROUND

Many individuals and organizations are interested in creating and distributing audio and video content. This typically involves acquiring a set of content elements (such as images, video, or audio tracks, as examples), modifying them as desired or needed, and then combining them into a completed sequence of frames (with or without an audio track) to form the final content.

Conventionally, this process is performed using a dedicated application, such as a desktop application or within a native iOS or Android application. However, using such an application has several disadvantages, including the need for a developer or publisher to provide access to and update the application being used to create the content. This is because a user needs to download and install the application, and the application or service provider needs to publish the application and maintain it in an application store or stores. Further disadvantages include the computational resources required to use the application and the complexity of the applications, which may result in difficulties for users who are attempting to generate content.

Embodiments of the systems, apparatuses, and methods disclosed herein are directed to solving these and related problems individually and collectively.

SUMMARY

The terms "invention," "the invention," "this invention," "the present invention," "the present disclosure," or "the disclosure" as used herein are intended to refer broadly to all the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

Embodiments are directed to a process for creating audio, video, or audio-video content in a browser application executing on a client device. In some embodiments, a web-based editing canvas enables a user to create a custom image, set of images, or video by adding audio, video, image, and other forms of "nodes" to a "canvas", and allowing the user to modify the nodes and then compile them into an image or video.

As mentioned, social sharing applications allow users to create, edit, and publish images and videos to their followers by adding overlays, editing the videos, or adding audio tracks. Conventionally, this has only been possible by using installed applications on clients such as Instagram's and TikTok's iOS and android applications or using video editing software applications on a computing device.

An in-browser implementation typically requires fewer computational resources, may require less time to execute, is simpler, typically provides an easier to use UI, and is not a dedicated software application with updates, bugs, or data security concerns. In some embodiments, the disclosed system, apparatuses, and methods enable a user to create audio-visual compositions in real time within a browser framework instead of using a dedicated application.

Embodiments of the disclosure are directed to systems, apparatuses, and methods for enabling users to create audio, video, or audio-video content. In one embodiment, a set of processes or software implemented tools are provided to enable a user (or a system/platform in response to a user's inputs) to perform one or more of the following steps, stages, methods, operations, or functions in a browser installed on a client device to create a composition:

Select one or more elements of content for use in generating an audio, visual, or audio-visual output;
  The element or elements of content may comprise html structures, images, gifs, video nodes (a link or location of a video file), or audio nodes (a link or location of an audio file), as non-limiting examples;
For each selected element of content, construct a "node", where a node has the following characteristics;
  A node represents the element of content;
  A node has an associated data structure stored in a datastore;
    The associated data structure includes data and information to determine how that node should be rendered in a final audio, video, or audio-video composition (e.g., a class representation that determines how to render the node in the user experience (UX) and the created composition by reading and applying the attributes);
      As an example, for an html node, an embodiment may use a DOM (document object model) element or an object describing the DOM element that includes text content, style attributes, and tag type;
      for an image node, an embodiment may use the source data, either as data or a URL and style attributes;
    The associated data structure includes data and information to determine how that node should be rendered in a user interface presented to a user, where the user interface may enable the user to alter, modify, or otherwise change one or more characteristics or parameters of the node;
    In one embodiment, the data structure includes the node type (gif, video, or html, as non-limiting examples), the node data, node styling, position, scale, and rotation;
Generate a UI Canvas as an HTML structure (using the HTML5 Canvas functionality) that displays nodes and provides the user a gesture interface to manipulate those nodes;
  In implementing the gesture interface, it is important to consider how to deal with a user applying multiple touch points, what happens when they change the touch points, and how to handle each type of user movement. As examples:

For positioning, the interface logic finds the centroid of the touchpoints and moves the objects;

For rotation, the interface logic calculates the distance in radians the user adjusts an object;

For changing multiple touch points, the interface logic creates a gesture session that tracks what the user is doing and locks them into that choice;

For scaling, the interface logic calculates the change in distance between two touch points to determine how much to change the scale of a node;

When a node is added to the datastore, it is represented in the user interface (UI). As non-limiting examples, a user can perform operations on a node that may comprise dragging, scaling, or rotating a node to change the node's style attributes in the datastore. Because these data attributes are changed in the datastore, the resulting composition will reflect the changes;

In general, examples of operations or changes a user could perform on a node with regards to its appearance or other characteristics may include but are not limited to or required to include;

Orientation (rotation), location (position), scale, background, contrast, color, resolution, or font type;

Assemble the selected content elements into a composition. As an example, the compilation of a video from content elements is performed by a process that creates a "shadow" Canvas that represents the UI Canvas and based on a desired framerate, iteratively "draws" each node onto the Canvas;

Each node class interprets the data and style attributes associated with it and draws itself onto the Canvas, or in the case of audio, plays the audio. While the nodes are drawn onto the canvas, a media recorder captures the audio and/or video streams frame by frame. When the compilation is done, a WebM[1] file of the composition is created.

[1] WebM is an audiovisual media file format. It is primarily intended to offer a royalty-free alternative for use with the HTML5 video and the HTML5 audio elements.

In some embodiments, the disclosed system, apparatus, or method may provide the disclosed functionality using an HTML5 element referred to as a Canvas.[2] In one embodiment, a

[2] The Canvas element or functionality is part of HTML5 and allows for dynamic, scriptable rendering of 2D shapes and bitmap images. It is a procedural model that updates a bitmap. A canvas consists of a drawable region defined in HTML code with height and width attributes. JavaScript code may access the area through a set of drawing functions similar to those of other 2-Dim. APIs, thus allowing for dynamically generated graphics. Uses of canvas include building graphs, animations, games, and image composition, as examples.

generated Canvas is composed of multiple "overlay" nodes. As disclosed, the nodes can be HTML structures such as text overlays, images, gifs, videos, or audio files. A user can interact with the nodes through an interface that allows them to move, scale, or rotate the nodes, as well as to perform other operations. These interactions are bound to a backend compilation process (in one embodiment, the interactions are bound to a node store, a compiler reads the node store to generate frames in a canvas, those frames are drawn onto the compiled canvas and the process outputs a video) that compiles the nodes into a composition, such as an audio, video, or audio-video scene, or sequence of scenes.

As further non-limiting examples, a node may be altered using the UI tools in accordance with the type of node. For example, image (or video frame) node changes may include contrast, color, depth, filtering, a change to resolution, or sampling. Audio node changes may include signal processing, filtering, changing pitch, changing playback speed, or combining with another audio track. Filters can be applied to all nodes, or to individual nodes, audio tracks can be modified, video tracks can be interpreted and modified, or images can be interpreted and modified. Further, "intelligent" forms of modification are also possible, such as reactive frame-based actions of the form "detect a face and put ears on it", "detect a screech noise and mute it", or "detect copyright protected music and mute it".

In some embodiments, the disclosed system, apparatus, or method incorporates what is referred to as a "dual bound canvas" to enable a user to edit, overlay, add audio tracks, or otherwise modify a set of images or video in real time and then compile the composed sequence of images or video into a video and/or audio file. Dual binding involves creating a data structure and a set of data in the structure, and then binding the structure to a UI element and binding the UI element to the data structure. In this way, changes to an element displayed in the UI (via the user interface tools, such as to move, scale, or rotate an item of content) are reflected in the datastore and are reflected in the complied/rendered video or other content.

In one embodiment, the disclosure is directed to a system, apparatus, and method to enable users to create audio, video, or audio-video content. The system or apparatus may include a set of computer-executable instructions stored in a memory or data storage component (such as one or more non-transitory computer-readable media) and one or more electronic processors or co-processors. When executed by the processors or co-processors, the instructions cause the processors or co-processors (or a device of which they are part) to perform a set of operations that implement an embodiment of the disclosed method or methods.

In one embodiment, the disclosure is directed to a set of computer-executable instructions stored in or on one or more non-transitory computer-readable media, wherein when the set of instructions are executed by one or more electronic processors or co-processors, the processors or co-processors (or a device of which they are part) perform a set of operations that implement an embodiment of the disclosed method or methods.

In some embodiments, the systems and methods disclosed herein may provide services or functionality through a SaaS or multi-tenant platform. The platform provides access to multiple entities, each with a separate account and associated data storage. Each account may correspond to a content creator, a content source, a set of sources, or an organization, for example. Each account may access one or more services, a set of which are instantiated in their account, and which implement one or more of the methods or functions disclosed and/or described herein.

Further, although the processes disclosed and/or described for creating a composition are performed by a user interacting with a browser application installed and executing on a client device, in some use cases, a user may wish to access content stored on a remote server and/or provide a completed composition to a remote server for distribution and to enable access by others.

Other objects and advantages of the systems, apparatuses, and methods disclosed will be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and are described in detail herein. However, embodiments of the disclosure are not limited to the exemplary or specific forms described. Rather, the disclosure covers all modifications, equivalents, and alternatives falling within the scope of the appended claims.

BRIEF DESCRIPTION OF THE DRAWINGS

Embodiments of the disclosure are described with reference to the drawings, in which.

Note that the same numbers are used throughout the disclosure and figures to reference like components and features.

DETAILED DESCRIPTION

Figure 1:
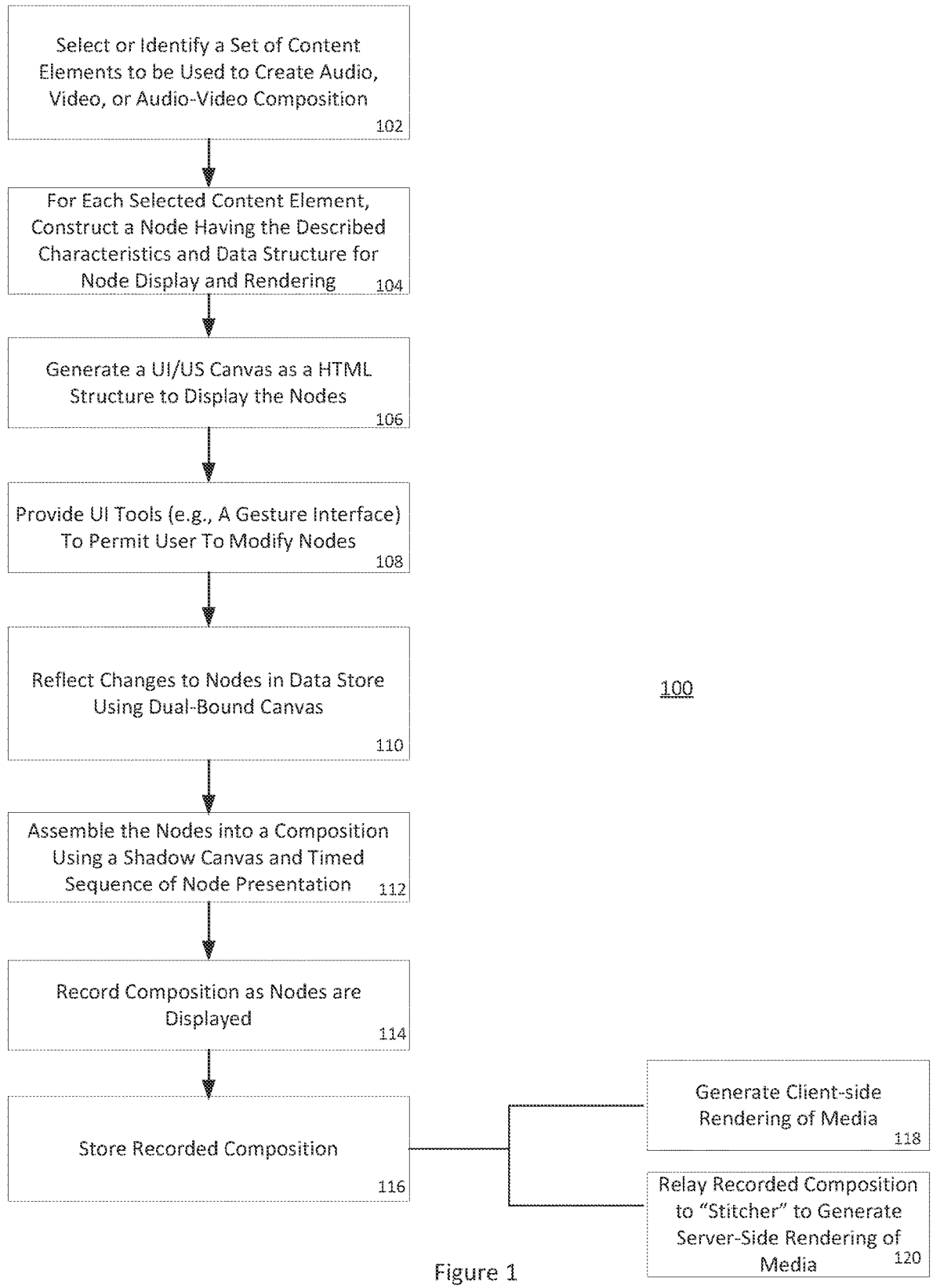
FIG. 1 is a flowchart or flow diagram illustrating a method, process, operation, or set of functions to enable users to create audio, video, or audio-video content in a browser application executing on a client device, in accordance with some embodiments.

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosed subject matter are described more fully herein with reference to the accompanying drawings, which show by way of illustration, example embodiments by which the disclosed systems, apparatuses, and methods may be practiced. However, the disclosure may be embodied in different forms and should not be construed as limited to the embodiments set forth herein; rather, these embodiments are provided so that the disclosure will satisfy the statutory requirements and convey the scope of the disclosure to those skilled in the art.

Among other forms, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods disclosed and/or described herein may be implemented by a suitable processing element or elements (such as a processor, microprocessor, CPU, GPU, TPU, QPU, state machine, or controller, as non-limiting examples) that are part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory computer-readable data storage elements. In some embodiments, the set of instructions may be conveyed to a user over a network (e.g., the Internet) through a transfer of instructions or an application that executes a set of instructions.

In some embodiments, the systems and methods disclosed herein may provide services or functionality through a SaaS or multi-tenant platform. The platform provides access to multiple entities, each with a separate account and associated data storage. Each account may correspond to a content creator, a content source, a set of sources, or an organization, for example. Each account may access one or more services, a set of which are instantiated in their account, and which implement one or more of the methods or functions disclosed and/or described herein.

Further, although the processes disclosed for creating a composition are performed by a user interacting with a browser application installed and executing on a client device, in some use cases, a user may wish to access content stored on a remote server and/or provide a completed composition to a remote server for distribution and to enable access by others.

In some embodiments, one or more of the operations, functions, processes, or methods disclosed herein may be implemented by a specialized form of hardware, such as a programmable gate array, application specific integrated circuit (ASIC), or the like. Note that an embodiment of the disclosed methods may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments of the systems and methods disclosed and/or described herein are directed to a system, apparatuses, and methods for enabling users to create audio, video, and audio-video content, and more specially, to create an audio-visual composition within a browser framework. As an example, a browser application executing on a client device (e.g., a laptop, desktop, tablet computer, or smartphone) may be used to select content for inclusion in a composition, modify the selected content, and compile or assemble the selected content into a video and/or audio composition.

As used herein, the following terms or phrases have at least the indicated meaning, but are not limited to:

Canvas—an element that is part of HTML5 and allows for dynamic, scriptable rendering of 2D shapes and bitmap images; and Nodes—a representation of an item of content that is placed into or onto a Canvas;

In one embodiment, the "editing canvas" is a DOM structure consisting of a full screen fixed position container that contains the nodes;

In some embodiments, there are three types of nodes used:

(1) a background node, which is a node that is in position z-index 1 and is 100% width/100% height—typically a color, gradient, or image;

(2) a root node, which is the primary node that is in position z-index 2 and can be manipulated with a 2-finger gesture, where the first finger does not touch on or near an overlay. In these cases, a gesture session is established and attaches to the root node and allows a user to rotate, scale, and reposition a node (as examples);

(3) overlay nodes, which sit on top of the root node and background node. An interaction with an overlay node that is the last in a sequence of interactions brings that node to the highest z-index in the canvas so that it is seen above others. If the first finger interacting with the editing canvas is near an overlay, a gesture session will attach to that object and allow the user to rotate, scale, and reposition it (as examples);

gesture sessions end when all touch points have ended (i.e., a user's fingers are off screen).

As non-limiting examples, the "nodes" referred to herein may comprise one or more of the following types of content or operators/functions:

Audio—Audio blobs (snippets) can be nodes. While the audio plays the stream is captured and merged in with the canvas stream;

Filters—CSS (cascading style sheet) and other modifying filters can be nodes. These nodes are dynamic and can affect the display of other overlays based on the "rules" implemented by the filters. A simple filter may be something such as a "vintage" filter that make a video look vintage. More complicated filters are filters such as "ear" filters that detect images in a video and draw animal ears onto the heads;

GIF—GIFs can be nodes. A GIF node is decomposed into frames and then based on the specific frame that is being drawn in the canvas, the associated GIF frame is drawn. GIF nodes should be loaded in a specific way that separates the GIF into frames and stores them in time-based intervals. When rendered, a GIF node uses the elapsed time of the compiler to determine which frame should be shown and then renders that frame;

HTML—An HTML fragment can be a node. To draw an HTML node, the HTML may be turned into an SVG, an image is captured from the SVG, and the image is drawn into a frame;

Image—An image can be a node. The image may be represented by a blob or a source URL. If it is represented by a blob it is drawn from memory; if it is represented by a URL, it is first downloaded and then drawn. All image, gif, html, and video nodes are drawn to scale with the proper angular rotation. When drawing these nodes to the canvas, the intended styles are accessed from the node store and the scale and rotation is applied to ensure it is placed properly; or Video—A video that can be played by the browser can be made into a node. Based on the canvas draw time the associated timestamp of the video is drawn onto the canvas.

As mentioned, in some embodiments, the disclosed system, apparatus, or method may provide the disclosed and/or described functionality using an HTML5 element referred to as a Canvas. The Canvas is accessed through a browser application executing on a client device. In one embodiment, a generated Canvas is composed of multiple "overlay" nodes. As described, the nodes can be HTML structures such as text overlays, images, gifs, videos, or audio files, as non-limiting examples.

A user interacts with the nodes through a Canvas user interface that allows the user to move, scale, or rotate the nodes (as examples), as well as to perform other operations that may be used to alter how the content associated with a node is displayed. These interactions are bound to a backend Canvas process that compiles these nodes into a composition, that is an audio, video, or audio-video scene or sequence of scenes. In some embodiments, a Canvas is composed of a background node that cannot be changed, a root node that is positioned directly above the background node and may have different interaction rules, and a set or group of overlay nodes that are positioned on top of the root node in a desired order.

In some embodiments, the disclosed system, apparatus, or method incorporates what is referred to as a "dual bound canvas" to enable a user to edit, overlay, add audio tracks, or otherwise modify an image, video, or audio track in real time and then compile the composition into a video and/or audio file. Dual binding involves creating a data structure and a set of data in the structure, and then binding the structure to a UI element and binding the UI element to the data structure. In this way, changes to an element displayed in the UI via the user interface tools (such as to move, scale, or rotate an item of content) are reflected in the datastore.

Node Store

Each overlay (that is, an element of content) is represented by a node with an associated data structure that represents how that node should be rendered or presented in both (a) the user interface/experience (UI/UX) and (b) in the produced audio, video, or audio-video composition. In some embodiments, the data structure includes the node type (GIF or video, as non-limiting examples), the node data, styling, position, scale, and rotation. Each node also has a class representation that determines how to render that node in the UI/UX and in the produced composition by reading and applying the attributes (where such attributes may include style attributes—font colors, font families, font size, background color, CSS (cascading style sheet) transformations, borders, or border radiuses, as non-limiting examples).

UI Composition Canvas

The UI Canvas is an html structure that displays the nodes and provides the user with a gesture interface to manipulate or modify the nodes. When a node is added to the data store, it is represented in the UI. As non-limiting examples, a user can drag, scale, or rotate the nodes to change their style attributes in the data store. Because the data attributes are changed in the data store, the resulting compiled video and/or audio will reflect those changes.

Gesture library

When a user touches the displayed canvas, the gesture library determines which node they are attempting to interact with and what they are trying to accomplish. As an example, if they use two fingers, they are attempting to interact with the root node—the main node in the canvas—and they can reposition it to the centroid of their fingers, scale it based on the distance of their fingers, or rotate it based on an angular change, as non-limiting examples. If the user uses one finger, the interface attempts to find a relevant overlay node and allows the user to interact with that node. As non-limiting examples, they can use one finger to reposition a node or apply a second finger to change its scale or rotate it. After a user applies changes to a node on the editing (UI/UX) Canvas, the changes are reflected in the node data store which ensures the changes will be reflected in the compiled audio, video, or audio-video composition or production.

Canvas Compiler

In one embodiment, the canvas compiler is a headless shadow canvas container (a copy of the editing canvas) which the compiler manipulates to make it match specific points in time. The compiler uses that information to draw to the actual HTML5 canvas to create a frame that is drawn to the compiler canvas, with the compiler canvas output to a video and/or audio. Thus, the canvas complier operates to "draw" a video at a particular frame rate, capture the media stream from it, and record it into a blob (a video sequence).

In one embodiment, the compiler has two modes, image or video, and based on the mode determines how to render the media (the nodes or content elements) in the produced output. Before the compiler runs, it iterates through the nodes and looks for nodes that have a duration. If a node has a duration, the compiler will run in video mode, otherwise it will run in image mode.

When running in image mode, the renderer/compiler will run through a single frame and draw all the nodes onto the canvas in the order of when they were last interacted with, that is, based on their z index. First, the background node, then the root node, then each overlay node depending on when it was last modified. After the last node is rendered, the canvas is exported to a PNG (portable networks graphic) format or other suitable format.

When running in video mode, the renderer/compiler first gathers the audio nodes and captures their tracks. Next, it creates a stream based on the Canvas node and extracts the video track from it. It then merges the video track and audio tracks together into an output stream and records the output stream. Next, the compiler iterates through each node and draws it onto the Canvas. Once it is done drawing each node onto the Canvas, it waits a set amount of time based on the desired frame rate of the video and runs through the loop again and draws the next frame onto the Canvas. Once it has finished drawing, it stops recording the output stream and exports a video from the recorder. The exported audio-video composition may be a WebM, MP4, or other format that the operating system/browser supports.

As disclosed and/or described, in some embodiments, the following functions or capabilities may be implemented as part of the overall process of generating or modifying an item of content:
 a gesture interface as described;
 a process to establish a gesture session and lock it to a node;
 a process to interpret multiple user touch points;
 a process to reposition a node by finding a centroid;
 a process to change a node's orientation (rotation) by calculating a difference in radians when a user rotates a node; and
 a process to change a node's scale by calculating a difference in distance when a user pinches or expands a node.

In one or more embodiments, a data processing flow that may be used to implement the approach disclosed and/or described herein may include one or more of the following steps, stages, processes, methods, operations, or functions:
 Enable a user to select one or more elements of content for use in generating an audio, visual, or audio-visual output;
  The element or elements of content may comprise html structures, images, gifs, video nodes (a link or location of a video file), or audio nodes (a link or location of an audio file), as non-limiting examples;
 For each selected element of content, construct a "node", where a node has the following characteristics;
  A node represents the element of content;
  A node has an associated data structure stored in a data store;
   The associated data structure includes data and information to determine how that node should be rendered in a final composition (e.g., a class representation that determines how to render the node in the created composition by reading and applying the attributes, where the attributes may include CSS/style attributes, contents, or source data as examples);
   The associated data structure includes data and information to determine how that node should be rendered in a user interface (UI/UX) presented to a user, where the user interface enables the user to alter, modify, or otherwise change one or more characteristics or parameters of the node;
   In one embodiment, the data structure includes the node type (gif, video, or html, as examples), the node data, node styling, position, scale, and rotation;
 Generate a UI Canvas as an HTML structure (using the HTML5 Canvas functionality) that displays nodes and provides the user a gesture interface to manipulate those nodes. When a node is added to the data store, it is represented in the UI/UX. As non-limiting examples, a user can perform operations on a node that may comprise dragging, scaling, or rotating a node, or altering contrast, color, font type, or resolution and as a result change the node's style attributes in the data store. Because these data attributes are changed in the data store, the resulting composition will reflect those changes;
 Compile or assemble the selected content elements into a composition. As an example, the compilation of a video is performed by a process that creates a "shadow" Canvas that represents the UI/UX Canvas and based on a desired framerate, iteratively "draws" each node onto the Canvas;
 Each node class interprets the data and style attributes associated with it and draws itself onto the Canvas, or in the case of audio, plays the audio. While the nodes are drawn onto the Canvas, a media recorder captures the audio and video streams frame by frame. When the compilation is done, a WebM[3] file of the composition is created.

[3] WebM is an audiovisual media file format. It is primarily intended to offer a royalty-free alternative for use with the HTML5 video and the HTML5 audio elements.

FIG. 1 is a flowchart or flow diagram illustrating a method, process, operation, or set of functions to enable users to create audio, video, or audio-video content in a browser application executing on a client device, in accordance with some embodiments. The illustrated data processing flow may be executed by a browser with the client device having access to the Internet, and/or by a set of executable instructions stored in the client device. The browser enables a user to access HTML5 libraries and functional capabilities. In some embodiments, the client device may be a smartphone, a laptop computer, a tablet computer, or a desktop computer.

As shown in the Figure, in one embodiment, the following set of steps, stages, functions, or operations may be performed:
 Select or Identify a Set of Content Elements to be Used to Create Audio, Video, or Audio-Video Composition (as suggested by stage or step 102);
 For Each Selected Content Element, Construct a Node Having the Described Characteristics and Data Structure for Node Display and Rendering (stage or step 104);
 Generate a UI/US Canvas as a HTML Structure to Display the Nodes (stage or step 106);
 Provide UI Tools (e.g., a Gesture Interface) to Permit User to Modify Nodes (stage or step 108);

Reflect Changes to Nodes in Data Store Using Dual-Bound Canvas (stage or step 110);

Assemble the Nodes into a Composition Using a Shadow Canvas and Timed Sequence of Node Presentation (stage or step 112);

Record Composition as Nodes are Displayed (stage or step 114); and

Store Recorded Composition (stage or step 116).

In some embodiments, the stored composition may be used to generate a client-side version of the composition by rendering the selected content elements (as suggested by stage or step 118);

In some embodiments, the stored composition may be relayed to a stitcher (as described herein) that operates to generate a server-side version of the composition by rendering the selected content elements (as suggested by stage or step 120).

Figure 2:
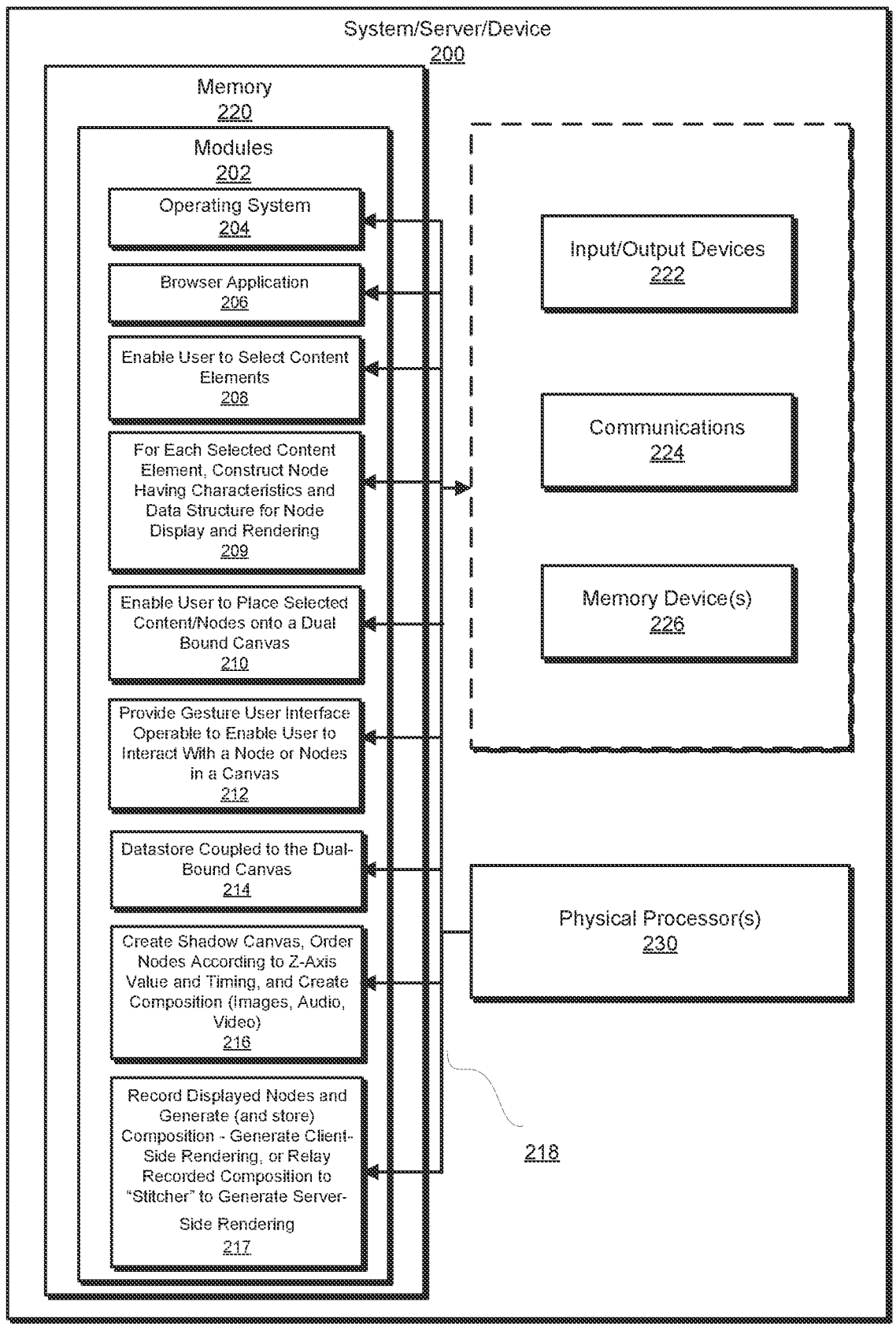
FIG. 2 is a diagram illustrating elements or components that may be present in a computing device or other form of client configured to implement a method, process, function, or operation in accordance with some embodiments.

FIG. 2 is a diagram illustrating elements or components that may be present in a computer device or system 200 configured to implement a method, process, function, or operation in accordance with some embodiments. As noted, in some embodiments, the disclosed and/or described system and methods may be implemented in the form of an apparatus that includes a processing element and a set of executable instructions stored in (or on) a non-transitory computer-readable memory or data storage component. The executable instructions may be part of a software application and arranged into a software architecture.

In general, an embodiment of the disclosure may be implemented using a set of software instructions that are designed to be executed by one or more suitably programmed processing elements (such as a GPU, TPU, CPU, QPU, state machine, microprocessor, processor, controller, or other computing device). In a complex application or system such instructions are typically arranged into "modules" with each such module typically performing a specific task, process, function, or operation. The entire set of modules may be controlled or coordinated in their operation by an operating system (OS) or other form of organizational platform.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As mentioned, each module may contain instructions which when executed by a programmed processor or co-processors cause an apparatus (such as a client device or server) to perform the specific function or functions. In some embodiments, the disclosed system may include both a client device and a remote server or platform. A module may contain instructions that are performed (in whole or in part) by a client device, a server or platform, or by both.

As shown in FIG. 2, system 200 may represent a client, server, or other form of computing or data processing device. Modules 202 each contain a set of executable instructions, where when the set of instructions is executed by a suitable electronic processor (such as that indicated in the figure by "Physical Processor(s) 230"), system (or device) 200 operates to perform a specific process, operation, function, or method. Modules 202 may contain one or more sets of instructions for performing a method or function described with reference to the Figures, and the descriptions of the functions and operations provided in the specification. The modules may include those illustrated but may also include a greater number or fewer number than those illustrated. Further, the modules or the computer-executable instructions that are contained in a module or modules may be executed by the same processor or by more than a single processor.

Modules 202 are stored in a memory 220, which typically includes an Operating System module 204 that contains instructions used (among other functions) to access and control the execution of the instructions contained in other modules. The modules 202 in memory 220 are accessed for purposes of transferring data and executing instructions by use of a "bus" or communications line 218, which also serves to permit processor(s) 230 to communicate with the modules for purposes of accessing and executing a set of instructions. Bus or communications line 218 also permits processor(s) 230 to interact with other elements of system 200, such as input or output devices 222, communications elements 224 for exchanging data and information with devices external to system 200, and additional memory devices 226.

Each application module or sub-module may correspond to a specific function, method, process, or operation that is implemented by the module or sub-module. Each module or sub-module may contain a set of computer-executable instructions that when executed by a programmed processor or co-processors cause the processor or co-processors (or a device or devices in which they are contained) to perform the specific function, method, process, or operation.

As described, in some embodiments, the processing flow for creating an audio, video, or audio-video composition using a browser may be implemented in the form of a client device executing an installed browser application. The browser application provides access to the HTML5 Canvas feature and as a result to the functionality disclosed and/or described herein. A connection between the client device and a remote server (typically via the Internet) may be used to access content elements and/or make a composition available to others.

As disclosed and/or described herein, in addition to a browser, an embodiment may include one or more of the following functions, capabilities, processes, or operations (each of which may be implemented in a client device and/or a remote server, depending upon the content being processed and the resulting output):

A canvas and a media recorder;

A set of functional capabilities that include one or more of:

a WYSIWYG editor (referred to as the editing canvas);

a gesture library to enable a user to manipulate the editor and reflect those changes in a node store;

a node store (data store);

a shadow container;

a compiler configured to run based on a framerate for a duration for each frame it interprets and draws each node to the shadow container. When all the nodes are drawn, it draws an image of the shadow container to a canvas. Once that is drawn, it copies that image onto a canvas that is being recorded.

With reference to FIG. 2, in some embodiments, the implemented steps, stages, elements, components, functions, methods, processes, or operations may include those used to perform one or more aspects of the disclosed and/or described system and methods, such as for:

A conventional browser application with a capability of implementing the functionality of HTML5 (as suggested by module 206);
  This includes the use of the Canvas feature;
  The Canvas accessible by the user is a dual-bound Canvas that is coupled to a data store;
A process to enable a user to select or identify a set of content elements to be used to create audio, video, or audio-video composition (as suggested by module 208);
A process to, for each selected content element, construct a node having the described characteristics and data structure for node display and rendering (as suggested by module 209);
A process to enable the user to place the selected content elements (nodes) onto a dual-bound canvas (module 210)—this may include a process to create the dual-bound canvas;
A process to provide a gesture user interface operable to enable the user to interact with a node or nodes in a Canvas (module 212):
  This may include enabling a user to modify attributes of a node, such as its location, orientation, or appearance, as non-limiting examples;
A process to create a data store coupled to the dual-bound Canvas (module 214);
A process to create a composition by using a shadow canvas and determining a z-axis value for each node and ordering the nodes in the composition in accordance with increasing z-value and a desired timing sequence (module 216); and
A process to record the displayed nodes and generate and store the composition (module 217);
  In some embodiments, the stored composition may be used to generate a client-side version of the composition by rendering the selected content elements;
  In some embodiments, the stored composition may be relayed to a stitcher (as described herein) that operates to generate a server-side version of the composition by rendering the selected content elements.

As disclosed and/or described herein, a client-side approach (for short videos) may include a compiler that operates as described—a renderer process runs at an interval of the desired framerate and draws frames based on nodes to an HTML5 canvas while it records it. This produces a fully composed video on the client side.

Although one embodiment of the disclosure is directed to a client-side process flow for creating content, in some situations, it may be desirable to develop a longer or more complex item of content, such as for longer compositions or when a user has an inefficient CPU or insufficient data storage capacity.

In such cases, an approach for creating longer or more complex videos may include the following. When a video is too long or too complex to render on a client side without frame drops, a library can export a zipped directory that contains the required information to compose the audio, video, or audio-video composition on a server. The zipped container may contain an array of source elements that are images, image representations of html, gifs, or videos, as non-limiting examples. The process builds a manifest.json file that contains directive information on how to instruct a process to "stitch" the elements together to form a final composition.

In some embodiments, an implementation may include building a "get rendering data" function that iterates through each node and generates the relevant information required to render without actually rendering and scales it to the appropriate resolution.

In one embodiment, the information and/or data may include:
filename <string>,
size <px width, px height>,
Rotation <radians>,
position <px x, px y>,
sourceData <blob>,
type <enum: gif, image, etc>.

An example manifest is shown below:

```
{
  "duration": 15,
  "muted": false,
  "nodes": [
    {
      "size": {
        "height": 2338,
        "width": 1080
      },
      "rotation": 0,
      "position": {
        "x": 0,
        "y": 0
      },
      "type": "html",
      "file": "0-html.png"
    },
    {
      "size": {
        "height": 2338,
        "width": 546
      },
      "rotation": 0,
      "position": {
        "x": 267,
        "y": 0
      },
      "type": "video",
      "file": "1-video.mp4"
    },
    {
      "size": {
        "height": 2338,
        "width": 1080
      },
      "rotation": 0,
      "position": {
        "x": 0,
        "y": 0
      },
      "type": "filter",
      "file": "2-filter.png"
    },
    {
      "size": {
        "height": 478,
        "width": 638
      },
      "rotation": 0,
      "position": {
        "x": 6,
        "y": 6
      },
      "type": "gif",
      "file": "3-gif.gif"
    },
    {
      "size": {
        "height": 204,
        "width": 1080
      },
      "rotation": 0,
      "position": {
```

```
            "x": 0,
            "y": 1002
          },
          "type": "html",
          "file": "4-html.png"
        },
        {
          "size": {
            "height": 332,
            "width": 332
          },
          "rotation": 0,
          "position": {
            "x": 0,
            "y": 1108
          },
          "type": "image",
          "file": "5-image.jpg"
        }
      ]
    }
```

An example of the contents of a Clip Folder is the following (where the clip folder contains assets (e.g., content elements) and a manifest). The manifest instructs a server (such as the referenced "stitcher") how to merge the assets into a single output media file (e.g., an image or video):

0—html.png
1—video.mp4
2—filter.png
3—gif.gif
4—html.png
5—image.jpg
manifest.json An example ffmpeg command that could be created based on a manifest and capable of stitching a final video together is as follows:

ffmpeg -i clip-5/0-html.png -i clip-5/1-video.mp4 -i clip-5/2-filter.png -ignore_loop 0 -i clip-5/3-gif.gif -i clip-5/4-html.png -i clip-5/5-image.jpg -filter_complex "[0]scale=1080:2338[out-0]; [1]scale=546:2338[scaled-1]; [scaled-1]rotate=angle=0:c=0x00000000:ow=rotw(0):oh=roth(0)[rotated-1]; [out-0][rotated-1]overlay=267:0[out-1]; [2]scale=1080:2338[scaled-2]; [scaled-2]rotate=angle=0:c=0x00000000:ow=rotw(0):oh=roth(0)[rotated-2]; [out-1][rotated-2]overlay=0:0[out-2]; [3]scale=638:478[scaled-3]; [scaled-3]rotate=angle=0:c=0x00000000:ow=rotw(0):oh=roth(0)[rotated-3]; [out-2][rotated-3]overlay=6:6[out-3]; [4]scale=1080:204[scaled-4]; [scaled-4]rotate=angle=0:c=0x00000000:ow=rotw(0):oh=roth(0)[rotated-4]; [out-3][rotated-4]overlay=0:1002[out-4]; [5]scale=332:332[scaled-5]; [scaled-5]rotate=angle=0:c=0x00000000:ow=rotw(0):oh=roth(0)[rotated-5]; [out-4][rotated-5]overlay=0:1108[out-5]"-map [out-5]-t 15 -acodec aac -vcodec libx264 -y clip-5/out.mp4.

In some embodiments, the disclosed system and methods my include a function that enables a way for a library to export the details of the generated content and the elements/assets as a manifest and element/asset library. This manifest and element/asset library can be sent to a server (termed a stitcher herein). The stitcher takes the manifest and the elements/assets and composes them into a render command to generate a single element/asset.

In this example, the library has two representations that are bound to a store of nodes. The first representation is the user experience, and a user can add/manipulate nodes to change them in the underlying data store. The second representation is a compiler, where the compiler can compile videos on the browser, can compile videos as a group of pictures in the browser, can take snapshots/create previews, and can export the node information and data elements/assets to a stitcher that builds an mp4 (or another suitable format).

In some embodiments, the data structures involved may include:

Manifest—The manifest is a structured data file containing information about each node contributing to a video (or audio or audio-video composition). This information may include positional data, start/stop data for visibility, sizing, rotation, and scale, as non-limiting examples. The manifest may also reference elements/assets associated with each node and contain start/stop time information within the element/asset. This feature enables a user to loop specific portions of an element/asset, such as playing seconds 4-6 of a video. Elements/assets are referenced by their ID, with assetStart and assetStop times stored as attributes;

Element/Asset Library—The element/asset library is a collection of multimedia assets, and may include images, videos, HTML tags, GIFs, and audio files, which can be used as nodes within a JavaScript library. The element/asset library allows a user to choose from various visual and audio elements to create their multimedia content. The library supports a range of element/asset types and formats, with limitations being dependent on the browser or device rather than the library itself; and Stitcher—The Stitcher is a server-side component operable to process and generate a final video (or audio or audio-video) output based on the user-defined manifest. It reads information about nodes, elements/assets, and their respective attributes from the manifest, such as positional data, start/stop times, sizing, rotation, and scale (as non-limiting examples). The Stitcher then stitches the elements/assets together following the specified parameters, producing the final video (or audio or audio-video) output. This backend (server-side) component enables the generation of relatively complex multimedia content using the manifest, effectively translating the user's creative input from the client-side library into a polished composition.

Embodiments as disclosed and/or described herein above can be implemented in the form of control logic using computer software in a modular or integrated manner. Based on the disclosure and teachings provided herein, a person of ordinary skill in the art will know and appreciate other ways and/or methods to implement one or more embodiments using hardware and a combination of hardware and software.

In some embodiments, certain of the methods, models or functions disclosed and/or described herein may be embodied in the form of a trained neural network, where the network is implemented by the execution of a set of computer-executable instructions or representation of a data structure. The instructions may be stored in (or on) a non-transitory computer-readable medium and executed by a programmed processor or processing element. The set of instructions may be conveyed to a user through a transfer of instructions or an application that executes a set of instructions over a network (e.g., the Internet). The set of instructions or an application may be utilized by an end-user through access to a SaaS platform or a service provided through such a platform.

This disclosure includes the following embodiments and clauses:

1. A method for creating content, comprising:
   receiving a selection of one or more content elements from a user to be used to create an audio, video, or audio-video composition;
   for each selected content element, constructing a node, wherein the node is associated with attributes and a data structure for the display and rendering of the node;
   generating a user interface canvas as a html structure to display the nodes;
   providing one or more user interface tools to permit the user to modify a node;
   reflecting changes to a node in a datastore using a dual-bound canvas;
   assembling the nodes into a composition using a shadow canvas and a timed sequence of node display; and
   recording the composition as nodes are displayed.

2. The method of clause 1, wherein the element or elements of content may comprise html structures, images, gifs, video, or audio.

3. The method of clause 1, wherein the data structure includes data and information to determine how that node should be rendered in an audio, video, or audio-video composition.

4. The method of clause 1, wherein the one or more user interface tools comprise a gesture interface.

5. The method of clause 1, wherein the timed sequence of node display is a function of the most recent node that has been altered or modified by the user.

6. The method of clause 2, wherein for an html node, a DOM element or an object describing the DOM element includes text content, style attributes, and tag type, and for an image node, the method uses the source data, either as data or a URL and style attributes.

7. The method of clause 1, further comprising storing the recorded composition in a local or remote data storage element.

8. A system, comprising:
   one or more electronic processors configured to execute a set of computer-executable instructions; and
   the set of computer-executable instructions stored in one or more non-transitory computer-readable media, wherein when executed, the instructions cause the one or more electronic processors to
     receive a selection of one or more content elements from a user to be used to create an audio, video, or audio-video composition;
     for each selected content element, construct a node, wherein the node is associated with attributes and a data structure for the display and rendering of the node;
     generate a user interface canvas as a html structure to display the nodes;
     provide one or more user interface tools to permit the user to modify a node;
     reflect changes to a node in a datastore using a dual-bound canvas;
     assemble the nodes into a composition using a shadow canvas and a timed sequence of node display; and
     record the composition as nodes are displayed.

9. One or more non-transitory computer-readable media including a set of computer-executable instructions that when executed by one or more programmed electronic processors, cause the processors to:
   receive a selection of one or more content elements from a user to be used to create an audio, video, or audio-video composition;
   for each selected content element, construct a node, wherein the node is associated with attributes and a data structure for the display and rendering of the node;
   generate a user interface canvas as a html structure to display the nodes;
   provide one or more user interface tools to permit the user to modify a node;
   reflect changes to a node in a datastore using a dual-bound canvas;
   assemble the nodes into a composition using a shadow canvas and a timed sequence of node display; and
   record the composition as nodes are displayed.

Any of the software components, processes or functions disclosed and/or described herein may be implemented as software code to be executed by a processor using a suitable computer language such as Python, Java, JavaScript, C++, or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive, or an optical medium such as a CD-ROM. In this context, a non-transitory computer-readable medium is a medium suitable for the storage of data or an instruction set aside from a transitory waveform. Such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as a display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar device or form of memory based on similar technologies. Such computer-readable storage media allow the processing element or processor to access computer-executable process steps or application programs, stored on removable and non-removable memory media, to off-load data from a device or to upload data to a device. As mentioned, with regards to the embodiments disclosed and/or described herein, a non-transitory computer-readable medium may include almost any structure, technology, or method apart from a transitory waveform or similar medium.

One or more embodiments of the disclosure are described herein with reference to block diagrams of systems, and/or to flowcharts or flow diagrams of functions, operations, processes, or methods. One or more blocks of the block diagrams, or one or more stages or steps of the flowcharts or flow diagrams, and combinations of blocks in the block diagrams and stages or steps of the flowcharts or flow diagrams, respectively, may be implemented by computer-executable program instructions. Note that in some embodiments, one or more of the blocks, or stages or steps may not need to be performed in the order presented or may not need to be performed at all.

The computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods disclosed and/or described herein. The computer-executable program instructions may be stored in (or on) a computer-readable memory that can direct a computer or other programmable data processing apparatus to function in a specific manner, such that the instructions stored in (or on) the computer-readable memory produce an article of manufacture including instruction means that implement one or more of the functions, operations, processes, or methods disclosed and/or described herein.

While embodiments of the disclosure have been described in connection with what is presently considered to be the most practical implementation, the disclosed and/or described approach is not limited to those embodiments. Instead, the disclosed and/or described embodiments are intended to cover various modifications and equivalent arrangements included within the scope of the appended claims. Although specific terms are employed herein, they are used in a generic and descriptive sense and not for purposes of limitation.

This written description includes one or more examples describing implementations of the disclosed approach to enable a person skilled in the art to practice one or more embodiments of the disclosure, including making and using a device or system and performing an incorporated method. The patentable scope of embodiments of the disclosure is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar references in the specification and in the claims are to be construed to cover both the singular and the plural, unless otherwise indicated herein or clearly contradicted by context. The terms "having," "including," "containing" and similar references in the specification and in the claims are to be construed as open-ended terms (e.g., meaning "including, but not limited to,") unless otherwise noted.

Recitation of ranges of values herein are intended to serve as a shorthand method of referring individually to each separate value inclusively falling within the range, unless otherwise indicated herein, and each separate value is incorporated into the specification as if it were individually recited herein. Methods or processes disclosed and/or described herein may be performed in any suitable order unless otherwise indicated herein or clearly contradicted by context. The use of examples, or exemplary language (e.g., "such as") herein is intended to illuminate embodiments of the disclosure and does not pose a limitation to the scope of the claims unless otherwise indicated. No language in the specification should be construed as indicating any non-claimed element as essential to each embodiment of the disclosure.

As used herein (i.e., the claims, figures, and specification), the term "or" is used inclusively to refer to items in the alternative and in combination.

Different arrangements of the components or operations illustrated in the drawings or disclosed and/or described herein, as well as components and steps not shown or explicitly described may be possible. Similarly, some features and sub-combinations may be useful and may be implemented without reference to other features and sub-combinations. Embodiments of the disclosure are described for illustrative and not for restrictive purposes, and alternative embodiments may be apparent. Accordingly, the disclosure is not limited to the embodiments described and/or illustrated in the drawings, and other embodiments and modifications may be made without departing from the scope of the claims.

That which is claimed is:

1. A method for creating content, comprising:
receiving a selection of one or more content elements from a user to be used to create an audio, video, or audio-video composition;
for each selected content element, constructing a node, wherein the node is associated with attributes and a data structure for the display and rendering of the node;
generating a user interface canvas as a html structure to display the nodes;
providing one or more user interface tools to permit the user to modify a node;
reflecting changes to a node in a datastore using a dual-bound canvas;
assembling the nodes into a composition using a shadow canvas and a timed sequence of node display; and
recording the composition as nodes are displayed.

2. The method of claim 1, wherein the element or elements of content may comprise html structures, images, gifs, video, or audio.

3. The method of claim 1, wherein the data structure includes data and information to determine how that node should be rendered in an audio, video, or audio-video composition.

4. The method of claim 1, wherein the one or more user interface tools comprise a gesture interface.

5. The method of claim 1, wherein the timed sequence of node display is a function of the most recent node that has been altered or modified by the user.

6. The method of claim 2, wherein for an html node, a DOM element or an object describing the DOM element includes text content, style attributes, and tag type, and for an image node, the method uses the source data, either as data or a URL and style attributes.

7. The method of claim 1, further comprising storing the recorded composition in a local or remote data storage element.

8. A system, comprising:
one or more electronic processors configured to execute a set of computer-executable instructions; and
the set of computer-executable instructions stored in one or more non-transitory computer-readable media, wherein when executed, the instructions cause the one or more electronic processors to receive a selection of one or more content elements from a user to be used to create an audio, video, or audio-video composition;

for each selected content element, construct a node, wherein the node is associated with attributes and a data structure for the display and rendering of the node;

generate a user interface canvas as a html structure to display the nodes;

provide one or more user interface tools to permit the user to modify a node;

reflect changes to a node in a datastore using a dual-bound canvas;

assemble the nodes into a composition using a shadow canvas and a timed sequence of node display; and record the composition as nodes are displayed.

9. The system of claim 8, wherein the element or elements of content may comprise html structures, images, gifs, video, or audio.

10. The system of claim 8, wherein the data structure includes data and information to determine how that node should be rendered in an audio, video, or audio-video composition.

11. The system of claim 8, wherein the one or more user interface tools comprise a gesture interface.

12. The system of claim 8, wherein the timed sequence of node display is a function of the most recent node that has been altered or modified by the user.

13. The system of claim 9, wherein for an html node, a DOM element or an object describing the DOM element includes text content, style attributes, and tag type, and for an image node, the method uses the source data, either as data or a URL and style attributes.

14. The system of claim 8, further comprising storing the recorded composition in a local or remote data storage element.

15. One or more non-transitory computer-readable media including a set of computer-executable instructions that when executed by one or more programmed electronic processors, cause the processors to:

receive a selection of one or more content elements from a user to be used to create an audio, video, or audio-video composition;

for each selected content element, construct a node, wherein the node is associated with attributes and a data structure for the display and rendering of the node;

generate a user interface canvas as a html structure to display the nodes;

provide one or more user interface tools to permit the user to modify a node;

reflect changes to a node in a datastore using a dual-bound canvas;

assemble the nodes into a composition using a shadow canvas and a timed sequence of node display; and record the composition as nodes are displayed.

16. The non-transitory computer-readable media of claim 15, wherein the element or elements of content may comprise html structures, images, gifs, video, or audio.

17. The non-transitory computer-readable media of claim 15, wherein the data structure includes data and information to determine how that node should be rendered in an audio, video, or audio-video composition.

18. The non-transitory computer-readable media of claim 15, wherein the one or more user interface tools comprise a gesture interface.

19. The non-transitory computer-readable media of claim 15, wherein the timed sequence of node display is a function of the most recent node that has been altered or modified by the user.

20. The non-transitory computer-readable media of claim 15, wherein for an html node, a DOM element or an object describing the DOM element includes text content, style attributes, and tag type, and for an image node, the method uses the source data, either as data or a URL and style attributes.

\* \* \* \* \*